US008347797B1

(12) United States Patent
Clay

(10) Patent No.: US 8,347,797 B1
(45) Date of Patent: Jan. 8, 2013

(54) SEED PLANTING DEVICE

(76) Inventor: Clarence D. Clay, Stone Mountain, GA (US)

( * ) Notice: Subject to any disclaimer, the term of this patent is extended or adjusted under 35 U.S.C. 154(b) by 288 days.

(21) Appl. No.: 12/700,670

(22) Filed: Feb. 4, 2010

(51) Int. Cl.
*A01C 5/00* (2006.01)
*A01C 5/02* (2006.01)

(52) U.S. Cl. ............................................. 111/92; 111/99

(58) Field of Classification Search .................. 111/170, 111/89, 92–117
See application file for complete search history.

(56) References Cited

U.S. PATENT DOCUMENTS

| 4,114,543 A | 9/1978 | Mitchell |
| D255,416 S | 6/1980 | Nicol |
| 4,206,714 A | 6/1980 | Walsh |
| 4,290,374 A | 9/1981 | Maples |
| 4,843,982 A | 7/1989 | Nagy-Szakaly |
| 5,924,369 A | 7/1999 | Hatcher |
| 6,289,828 B1 | 9/2001 | Wittenberg |
| 6,659,028 B1 | 12/2003 | Hatfield |
| 6,662,736 B1 | 12/2003 | Lowe et al. |

*Primary Examiner* — Christopher J. Novosad

(57) ABSTRACT

A seed planting device comprising a shaft having a handle disposed on the first end and a base attached to the second end; a plurality of spikes removably attached to the bottom surface of the base, the spike being for driving into a ground area so as to aerate soil; a seed tube attached to the outer surface of the shaft, wherein seeds are housed in an inner cavity of the seed tube; the seeds can be dispensed from the inner cavity via a hole disposed in a second end of the seed tube that fluidly connects to a tube that traverses the base via a channel; and a valve disposed at the second end of the seed tube moveable between an open position and a closed position for respectively allowing and preventing seeds from being dispensed from the seed tube.

10 Claims, 3 Drawing Sheets

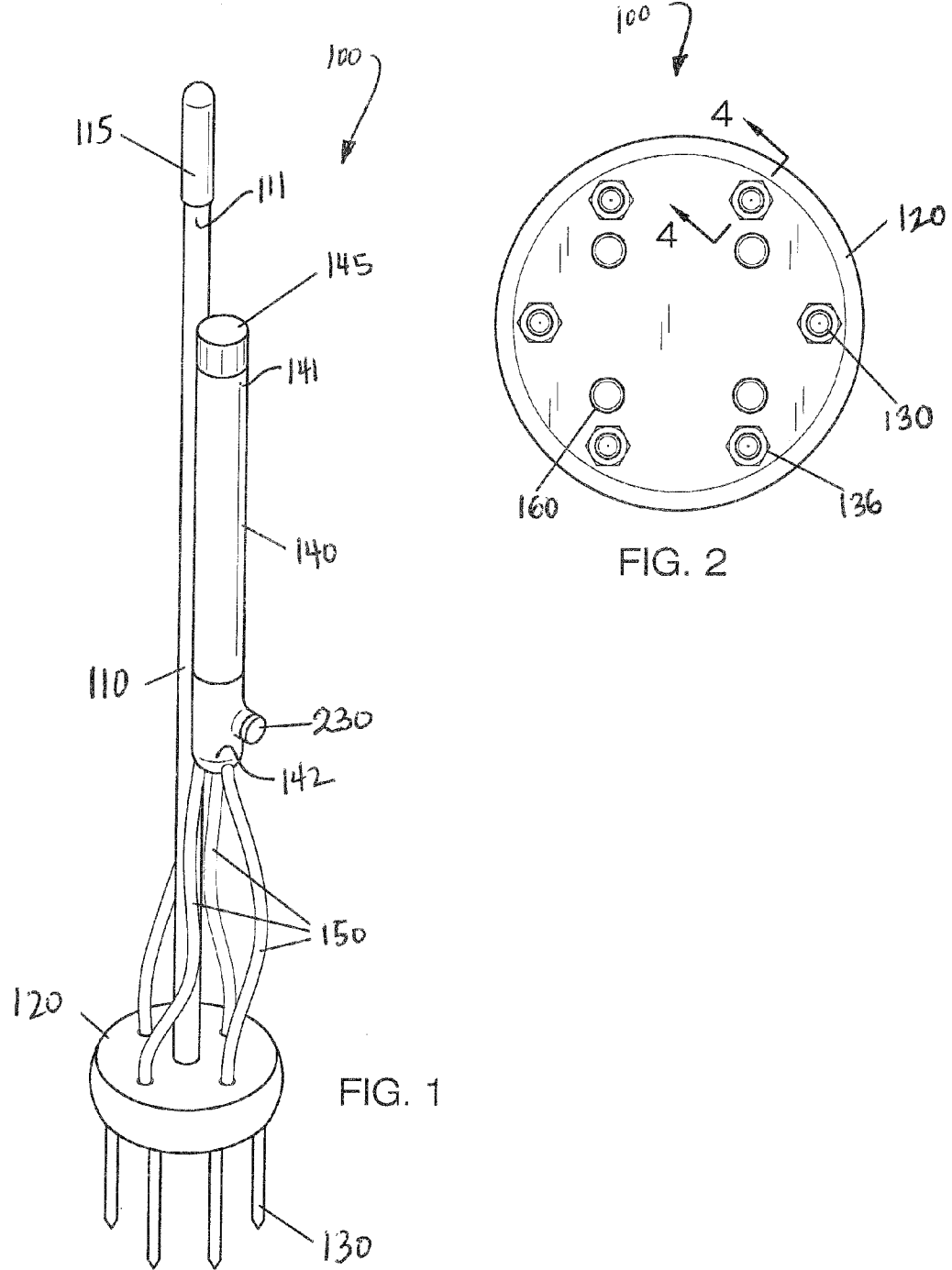

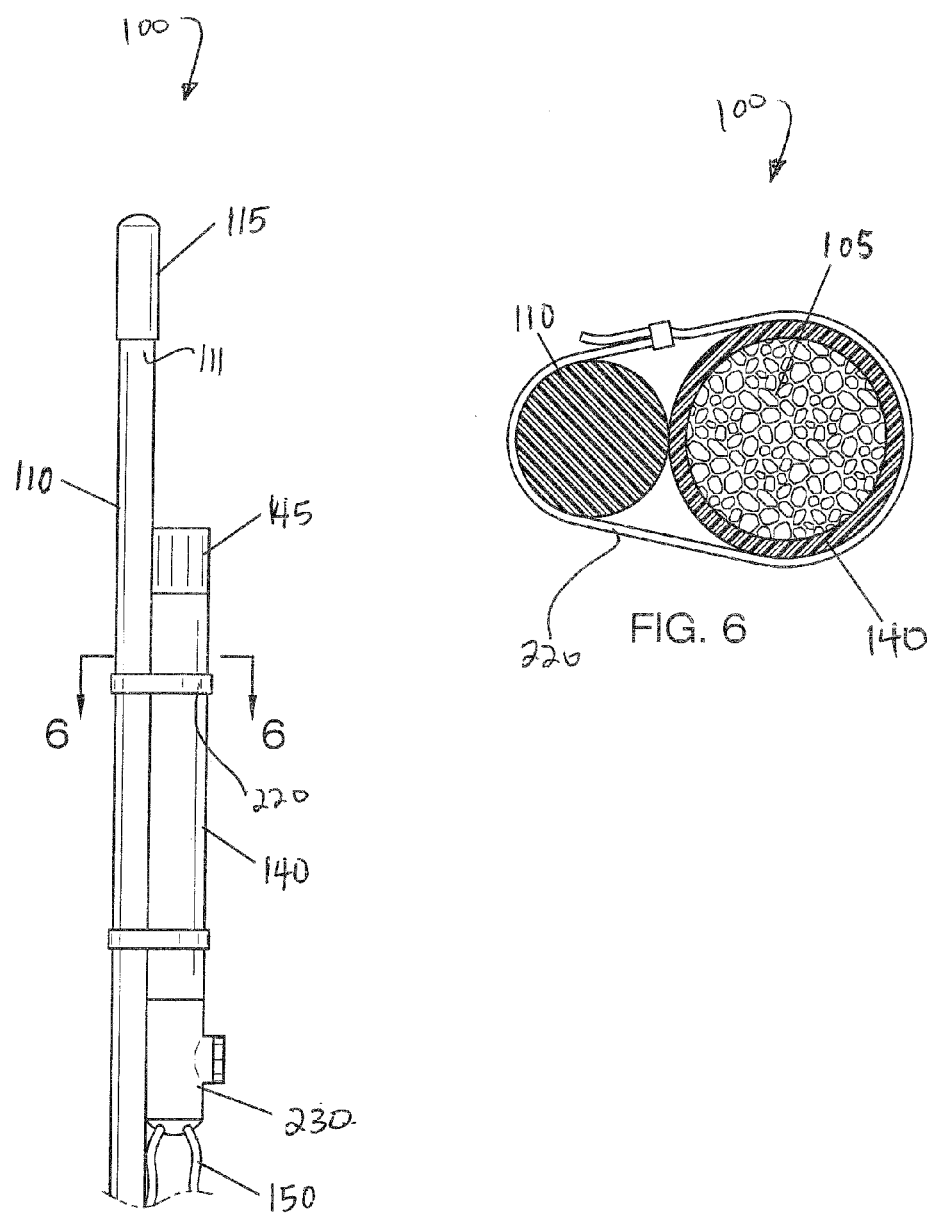

SEED PLANTING DEVICE

FIELD OF THE INVENTION

The present invention is directed to a device for facilitating the planting of seeds, more particularly to a device having a plurality of spikes for aerating the soil and a seed-containing tube for dispensing seeds onto the ground.

BACKGROUND OF THE INVENTION

Planting seeds effectively can be particularly time consuming. The present invention features a tool for planting seeds in flower beds, home gardens, and even commercial gardens. The tool may also be used to aerate soil. The seed planting device of the present invention can help save a user time and effort.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 1 is a perspective view of the seed planting device of the present invention.

FIG. 2 is a bottom view of the seed planting device of the present invention.

FIG. 5 is a side view of the seed planting device of the present invention.

FIG. 6 is a top cross sectional view of the seed planting device of the present invention.

DESCRIPTION OF PREFERRED EMBODIMENTS

Figure 3:
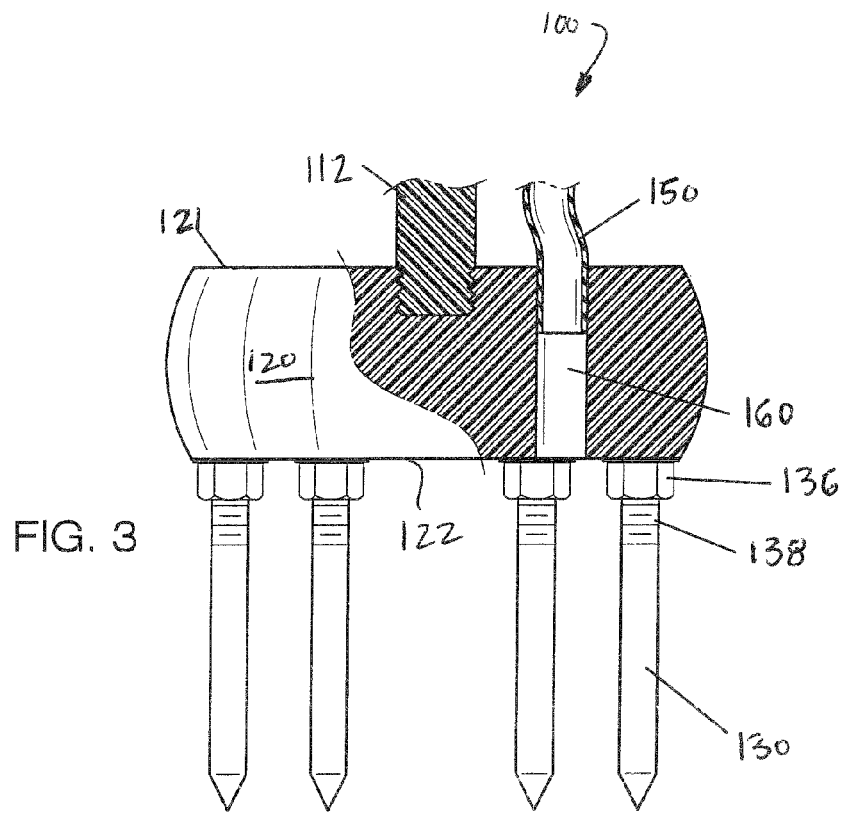
FIG. 3 is a side and cross sectional view of the seed planting device of the present invention.
Figure 4:
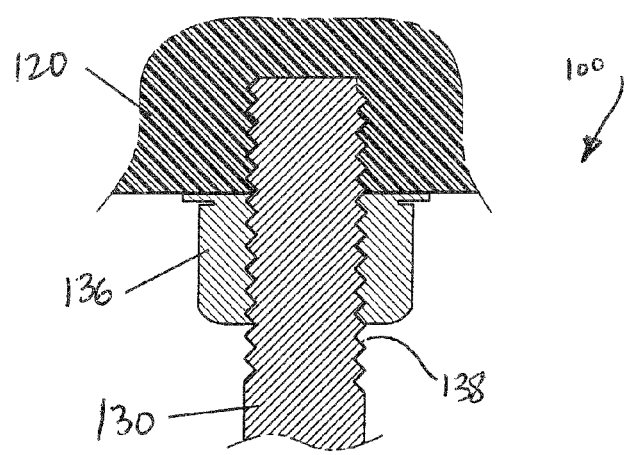
FIG. 4 is a cross sectional view of a spike of the seed planting device of the present invention.

The following is a listing of numbers corresponding to a particular element refer to herein:
100 seed planting device
105 seed
110 shaft
111 first end of shaft
112 second end of shaft
115 handle
120 base
130 spike
136 nut
138 threading
140 seed tube
141 first end of seed tube
142 second end of seed tube
145 cap
150 tube
160 channel
220 attachment means
230 valve Referring now to FIGS. 1-5, the present invention features a seed planting device 100 for facilitating the planting of seeds 105 as well as aerating soil. The seed planting device 100 may help a user plant seeds 105 in bare spots on a lawn.

The seed planting device 100 comprises a shaft 110 having a first end 111, a second end 112, and an outer surface. In some embodiments, a handle 115 is attached to the first end 111 of the shaft 110. The handle 115 may help a user grip the shaft more easily.

Disposed at the second end 112 of the shaft 110 is a base 120. The base 120 has a top surface 121 and a bottom surface 122. The top surface 121 is attached to the second end 112 of the shaft 110, for example via a first attachment means (e.g., welding, a screw mechanism, a clip or snap mechanism, the like). Disposed on the bottom surface 122 of the base 120 are one or more spikes 130. A user can drive the spikes 130 into the ground so as to aerate the soil.

In some embodiments, one spike 130 is attached to the base 120. In some embodiments, two spikes 130 are attached to the base 120. In some embodiments, three spikes 130 are attached to the base 120. In some embodiments, four spikes 130 are attached to the base 120. In some embodiments, five spikes 130 are attached to the base 120. In some embodiments, six spikes 130 are attached to the base 120. In some embodiments, more than six spikes 130 are attached to the base 120.

The spikes 130 may be removably attached to the base 120 via a second attachment means. For example, in some embodiments, the second attachment means is a threading 138 is disposed on the first end of the spike 130. The threading 138 may screw into a nut 136 attached to the bottom surface 122 (or disposed in the bottom surface 122) of the base 120 (see FIG. 4). Without wishing to limit the present invention to any theory or mechanism, it is believed that the removable spikes 130 of the present invention are advantageous because they allow a user to choose the number of spikes 130 he/she wishes to use with the seed planting device 100.

In some embodiments, one or more measurements are etched on a spike 130. The measurements may be for indicating how far into the ground the spike 130 is driven. For example, a 1.5 inch measurement may be etched in a spike 1.5 inches above the second end. Thus, when a user drives the spike into the ground, he/she knows that he/she has driven the spike into the ground 1.5 inches if the ground is level with the 1.5 inch measurement.

Attached to the outer surface of the shaft 110 is a seed tube 140 having a first end 141, a second end 142, an inner cavity, and an outside surface. In some embodiments, the seed tube 140 is fixedly attached to the shaft 110. In some embodiments, the seed tube 140 is removably attached to the shaft 110 via a third attachment means 220. The third attachment means 220 may include a strap mechanism, a clip mechanism, a snap mechanism, a hook-and-loop fastener, a tying mechanism, the like, or a combination thereof.

The seed tube 140 is for housing seeds 105. A cap 145 may be removably attached to the first end 141 of the seed tube 140. The cap 145 allows the inner cavity of the seed tube 140 to be closed off, for example to prevent seeds 105 from spilling out of the first end 141 of the seed tube 140.

Disposed at the second end 142 of the seed tube 140 is a hole for allowing the seeds 105 to be dispensed from the inside cavity of the seed tube 140. The hole fluidly connects to multiple tubes 150. The tubes 150 traverses the base 120 from the first end 121 to the second end 122 via channels 160. The seeds 105 from inside the seed tube 140 can be dispensed through the hole, the tubes 150, and the channel 160, and out from the base 120.

In some embodiments, a valve 230 is disposed at the second end 142 of the seed tube 140. The valve 230 can move between an open position and a closed position. In the open position, seeds 105 from the seed tube 140 can be dispensed into the tube 150. In the closed position, the valve 230 prevents the seeds 105 from being dispensed from the seed tube 140. The user is able to move the valve 230 to the open position and the closed position as he/she wishes.

When the valve 230 is the in open position, the seeds 105 can fall to the ground surface. If the spikes 130 have been used to aerate the ground surface, the seeds 105 can fall into the holes that were created by the spikes 130.

The seed planting device 100 of the present invention may be constructed from a variety of materials. For example, in some embodiments, the seed device 100 is constructed from a material comprising a plastic, a metal (e.g., steel,), rubber, the like, or a combination thereof.

The seed planting device 100 of the present invention may be constructed in a variety of sizes. In some embodiments, the shaft 110 is between about 3 to 4 feet in length as measured from the first end 111 to the second end 112. In some embodiments, the shaft 110 is between about 4 to 5 feet in length as measured from the first end 111 to the second end 112. In some embodiments, the shaft 110 is more than about 5 feet in length.

In some embodiments, the spike 130 is between about 0.5 to 1.0 inches in length as measured from the first end to the second end. In some embodiments, the spike 130 is between about 1 to 2 inches in length as measured from the first end to the second end. In some embodiments, the spike 130 is more than about 2 inches in length.

As used herein, the term "about" refers to plus or minus 10% of the referenced number. For example, an embodiment wherein the spike 130 is about 2 inches in length includes a spike 130 that is between 1.8 and 2.2 inches in length.

The following the disclosures of the following U.S. Patents are incorporated in their entirety by reference herein: U.S. Pat. No. 6,662,736; U.S. Pat. No. 6,289,828; U.S. Pat. No. 4,290,374; U.S. Pat. No. 4,206,714; U.S. Pat. No. 4,843,982; U.S. Pat. No. 6,659,028; U.S. Pat. No. 4,114,543; U.S. Pat. No. 5,924,369.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A seed planting device comprising:
    (a) a shaft having a first end, a second end, and a handle disposed on the first end;
    (b) a base attached to the second end of the shaft;
    (c) a spike removably attached to a bottom surface of the base, the spike being for driving into a ground area so as to aerate soil, wherein a measurement is etched on the spike for indicating how far into the ground area the spike is driven;
    (d) a seed tube attached to an outer surface of the shaft via an attachment means, wherein a removable cap is attached to the top end of seed tube and seeds are housed in an inner cavity of the seed tube, the seeds are dispensed from the inner cavity via a hole disposed in a second end of the seed tube that fluidly connects to multiple tubes that traverses the base via multiple channels; and
    (e) a valve disposed at the second end of the seed tube moveable between an open position and a closed position for respectively allowing and preventing seeds from being dispensed from the seed tube.

2. The seed planting device of claim 1 comprising two spikes.

3. The seed planting device of claim 1 comprising three spikes.

4. The seed planting device of claim 1 comprising four spikes.

5. The seed planting device of claim 1 comprising five spikes.

6. The seed planting device of claim 1 comprising six spikes.

7. The seed planting device of claim 1 comprising more than six spikes.

8. The seed planting device of claim 1, wherein a threading is disposed on a first end of the spike that screws into a nut attached to the bottom surface of the base.

9. The seed planting device of claim 1, wherein the attachment means is a strap mechanism, a clip mechanism, a snap mechanism, a hook-and-loop fastener, a tying mechanism, or a combination thereof.

10. The seed planting device of claim 1 further comprising a cap removably attached to a first end of the seed tube for closing off the inner cavity of the seed tube.

* * * * *